(12) United States Patent
Chen

(10) Patent No.: US 9,063,260 B2
(45) Date of Patent: Jun. 23, 2015

(54) LED TUBE WITH LIGHT REFLECTIVE FACE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 43 days.

(21) Appl. No.: 13/951,411

(22) Filed: Jul. 25, 2013

(65) Prior Publication Data

US 2015/0016147 A1  Jan. 15, 2015

(30) Foreign Application Priority Data

Jul. 15, 2013 (TW) .............................. 102125301 U

(51) Int. Cl.
*F21V 8/00* (2006.01)

(52) U.S. Cl.
CPC .............. *G02B 6/0033* (2013.01); *G02B 6/001* (2013.01)

(58) Field of Classification Search
CPC ............. F21K 9/17; F21K 9/175; F21K 9/52; G02B 6/001
USPC .......................... 362/23.09, 23.16, 223, 555, 362/217.05–217.07; 33/23.09, 23.16, 223, 33/555
See application file for complete search history.

(56) References Cited

U.S. PATENT DOCUMENTS

| | | | |
|---|---|---|---|
| 2006/0120098 A1* | 6/2006 | Ikeda et al. .................... | 362/551 |
| 2009/0219586 A1* | 9/2009 | Fujimoto et al. ............... | 358/494 |
| 2010/0097801 A1* | 4/2010 | Deng ............................. | 362/235 |
| 2013/0016519 A1* | 1/2013 | Kuo ............................... | 362/555 |
| 2013/0163280 A1* | 6/2013 | Lin et al. ....................... | 362/609 |

* cited by examiner

*Primary Examiner* — Anh Mai
*Assistant Examiner* — Steven Horikoshi
(74) *Attorney, Agent, or Firm* — Novak Druce Connolly Bove + Quigg LLP

(57) ABSTRACT

An LED tube includes a light guide, an LED and a reflector. The light guide includes a light incident face at an end thereof and a light emerging face adjacent to the light incident face. The reflector is mounted on an opposite end of the light guide. The reflector forms a light reflective face facing the light guide to reflect light backward into the light guide.

14 Claims, 5 Drawing Sheets

LED TUBE WITH LIGHT REFLECTIVE FACE

BACKGROUND

1. Technical Field

The disclosure generally relates to an LED (light emitting diode) tube, and more particularly, to an LED tube with a light reflective face.

2. Description of Related Art

Nowadays LEDs (light emitting diodes) are applied widely in various occasions for illumination. A typical LED tube includes a light guiding rod and an LED placed on an end of the rod. The rod generally forms micro structures for destroying total reflection of the light within the rod. Thus, light emitted from the LED and into the rod can be diffused by the micro structures to radiate out of the rod.

The LED is a highly pointed light source. The light passing through the end of the rod has a large ratio directly reaching the opposite end of the rod. However, the typical LED tube does not have any optical structure formed on the opposite end of the rod to collect the light. Thus, the light reaching the opposite end of the rod cannot be effectively utilized, thereby causing waste of the light. As a result, the light emitting efficiency of the LED tube is limited.

What is needed, therefore, is an LED tube with a reflective face which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
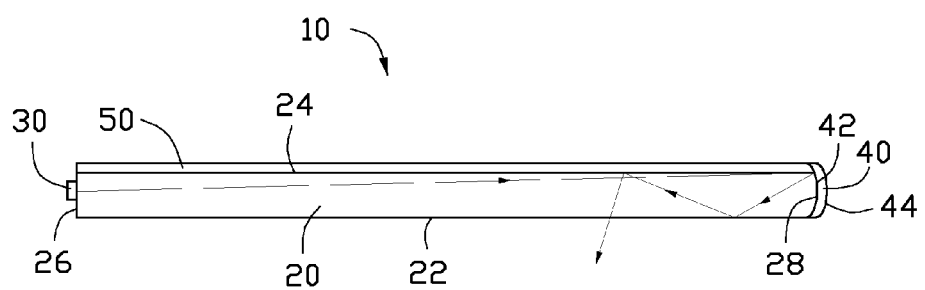
FIG. 1 shows an LED tube in accordance with a first embodiment of the present disclosure.

Referring to FIG. 1, an LED (light emitting diode) tube 10 in accordance with a first embodiment of the present disclosure is shown. The LED tube 10 includes a light guide 20, an LED 30 placed on a left end of the light guide 20 and a reflector 40 attached on a right end of the light guide 20.

The light guide 20 may be made of transparent material such as epoxy, glass or the like. In this embodiment, the light guide 20 is elongated and straight. The light guide 20 includes a light incident face 26 at the left end thereof, an end face 28 at the right end thereof and a light emerging face 22 at a bottom face thereof. The light incident face 26 is a flat face. The end face 28 is a curved convex face. The light emerging face 22 is located between the light incident face 26 and the light reflective face 28. A light diffusion face 24 is formed on a top face of the light guide 20. The light diffusion face 24 may include a plurality of micro structures 50 such as protrusions or grooves which can diffuse light towards various directions.

The LED 30 is located at the light incident face 26 of the light guide 20. The LED 30 may be a white LED 30 which can emit white light when being powered. The LED 30 directly contacts the light incident face 26 of the light guide 20 so that the white light emitted from the LED 20 can transmit to an interior of the light guide 20 through the light incident face 26.

The reflector 40 is attached on the end face 28 of the light guide 20. The reflector 40 may be formed by plating a metal film on the end face 28 of the light guide 20 or adhering a metal layer on the end face 28 of the light guide 20. The reflector 40 includes a curved concave inner face and a curved convex outer face 44. The inner face of the reflector 40 acts as a reflective face 42 directly contacting the end face 28 of the light guide 20. The light transmitting to the end face 28 from the light incident face 26, can be reflected by the reflective face 42 back to the interior of the light guide 20 through the end face 28. The reflected light is then diffused by the light diffusion face 24 to radiate out of the light guide 20 through the light emerging face 22. Therefore, the light transmitting to the end face 28 of the light guide 20 is not wasted, and a light emitting efficiency of the LED tube 10 is raised accordingly.

Figure 2:
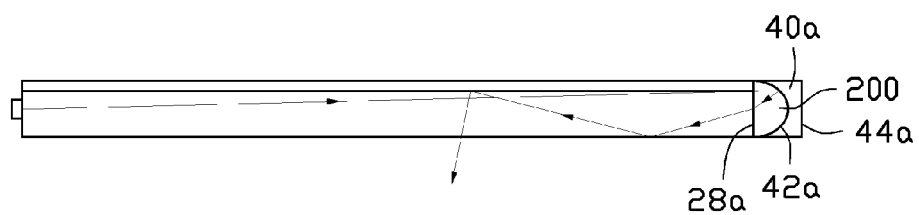
FIG. 2 shows an LED tube in accordance with a second embodiment of the present disclosure.

Alternatively, as shown in FIG. 2, the end face 28a of the light guide 20 can also be a flat face. The reflective face 42a of the reflector 40a is thus spaced from the end face 28a of the light guide 20 via a gap 200. In this embodiment, the reflective face 42a has a curvature larger than that of the reflective face 42 of FIG. 1. The outer face 44a of the reflector 40a is flat. A distance between the outer face 44a and the reflective face 42a of the reflector 40a gradually decrease and then increase from a top to a bottom of the reflector 40a. Light emerging from the end face 28a of the light guide 20 passes through the gap 200, and is then reflected by the reflective face 42a of the reflector 40a back to the interior of the light guide 20 through the gap 200. The backward light is then diffused by the light diffusion face 24 to radiate out of the light guide 20 through the light emerging face 22.

Figure 3:
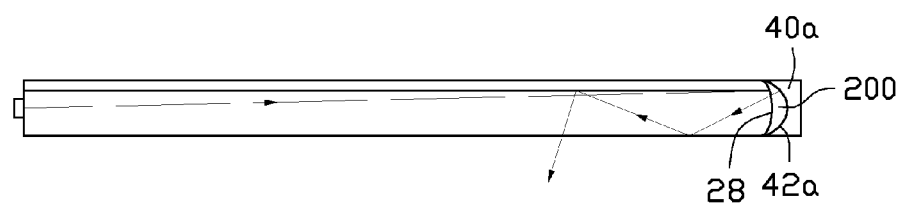
FIG. 3 shows an LED tube in accordance with a third embodiment of the present disclosure.

Furthermore, as shown in FIG. 3, the reflector 40a of FIG. 2 can be used with the light guide 20 of FIG. 1. The reflective face 42a of the reflector 40a is still spaced from the end face 28 via the gap 200 since the reflective face 42a has a curvature larger than that of the end face 28.

Figure 4:
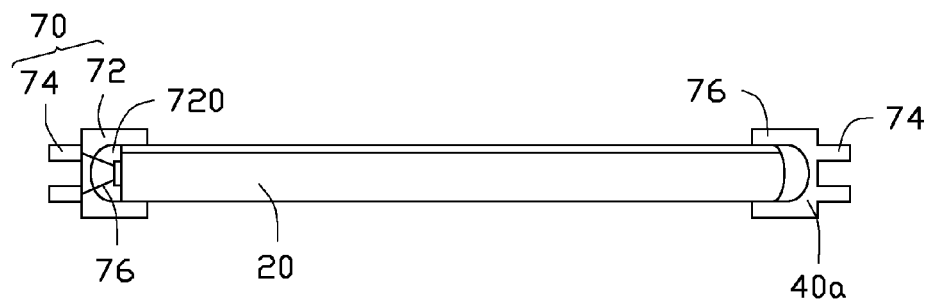
FIG. 4 shows an LED tube in accordance with a fourth embodiment of the present disclosure.

Referring to FIG. 4, the LED tube 10 can further includes two lids 70 mounted on the left end and the right end of light guide 20. Each lid 70 includes a housing 72 and a two pins 74 protruding outwardly from an outer face of the housing 72. The housing 72 defines a gap 720 in an inner face thereof and a sidewall 78 surrounding the gap 720. The left end and the right end of the light guide 20 are inserted to the two cavities 720 of the two housings 72, respectively. The left end and the right end of the light guide 20 are engaged with and surrounded by the sidewalls 78 of the two housings 72, respectively. Thus, the two lids 70 are fixed on the light guide 20. The LED 30 is received in the gap 720 of a left lid 70, and electrically connected to the two pins 74 of the left lid 70 via two wires 76. The right lid 70 does not have LED 30 and wire 76 therein. In other words, the two pins 74 of the right lid 70 do not electrically connect with the LED 30. In this embodiment, the reflector 40a of FIG. 3 is incorporated within the right lid 70, and the gap 200 of the reflector 40a is the gap 720 of the right lid 70. That is to say, an inner face of the housing 72 of the right lid 70 defining the gap 720 forms the reflective face 42a of FIG. 3. Alternatively, the housing 72 of the left lid 70 may also incorporate the reflector 40a of FIG. 3 therein for increasing light utilizing efficiency of the LED 30.

Figure 5:
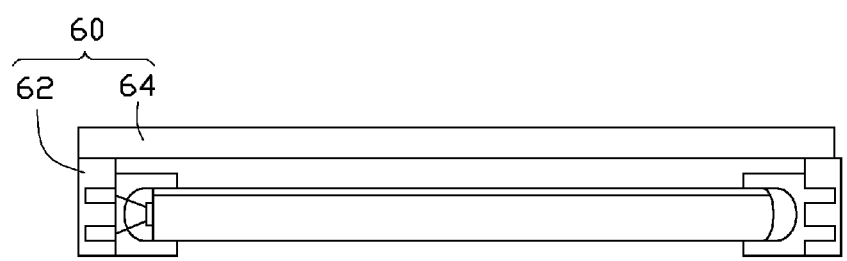
FIG. 5 shows the LED tube of FIG. 4 mounted on a lamp supporter

Referring to FIG. 5, the LED tube 10 of FIG. 4 can be mounted to a lamp support 60. The lamp support 60 has a shape similar to a typical tube support. The lamp support 60 includes two sockets 62 and a lampshade 64 mounted on the two sockets 62. The two pins 74 of each lid 70 are inserted to a corresponding socket 62 for fixing the LED tube 10 to the lamp support 60. However, only the left socket 62 supplies power for the LED 30 through the pins 74 of the left lid 70, the right socket 62 does not supply power for the LED 30 since no wire is connected to the pins 74 of the right lid 70. The lampshade 64 covers the light guide 20 to prevent dust or other contaminant from falling on the light guide 64.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED (light emitting diode) tube comprising:
   a light guide comprising a light incident face formed on a first end thereof, and a light emerging face;
   a light reflective face located at a second end of the light guide opposite to the first end, the light emerging face being located between the light incident face and the light reflective face; and
   an LED facing the light incident face;
   wherein light emitted from the LED transmits into the light guide through the light incident face, is then reflected by the light reflective face back into the light guide, and finally exits out of the light guide through the light emerging face;
   wherein the light guide forms an end face at the second end thereof, the light emerging face being located between the light incident face and the end face;
   wherein there is a gap located between the light reflective face and the end face;
   wherein the light reflective face is a curved and concave face; and
   wherein the end face is a curved and convex face.

2. The LED tube of claim 1, wherein the light reflective face has a curvature larger than that of the end face.

3. The LED tube of claim 2, wherein a reflector is located on the second end of the light guide, the light reflective face being an inner face of the reflector.

4. The LED tube of claim 3 further comprising two lids mounted to the first end and the second end of the light guide, respectively, wherein each lid comprises a housing receiving each of the first end and the second end of the light guide and two pins protruding outwardly from the housing.

5. The LED tube of claim 4, wherein the gap is defined in the housing of the lid mounted to the second end, the housing comprising a sidewall surrounding the gap, the second end of the light guide contacting and being surrounded by the sidewall of the lid mounted to the second end.

6. The LED tube of claim 5, wherein the lid mounted to the first end of the light guide also defines another gap to receive the LED.

7. The LED tube of claim 6, wherein the reflector is incorporated within the lid mounted to the second end of the light guide.

8. The LED tube of claim 1, wherein the light guide forms a light diffusion face opposite to the light emerging face.

9. The LED tube of claim 8, wherein the light diffusion face comprises a plurality of micro structures to diffuse the light reflected back into the light guide.

10. The LED tube of claim 1, wherein the LED contacts the light incident face of the light guide directly.

11. An LED (light emitting diode) tube comprising:
    a light guide comprising a light incident face formed on a first end thereof, and a light emerging face;
    a light reflective face located at a second end of the light guide opposite to the first end, the light emerging face being located between the light incident face and the light reflective face; and
    an LED facing the light incident face;
    wherein light emitted from the LED transmits into the light guide through the light incident face, is then reflected by the light reflective face back into the light guide, and finally exits out of the light guide through the light emerging face;
    the light guide forms an end face at the second end thereof;
    the end face is a curved and convex face; and
    wherein there is a gap located between the light reflective face and the end face.

12. The LED tube of claim 11, wherein the light emerging face being located between the light incident face and the end face.

13. The LED tube of claim 11, wherein the light reflective face is a curved and concave face.

14. The LED tube of claim 13, wherein the light reflective face has a curvature larger than that of the end face.

* * * * *